(12) United States Patent
Shin et al.

(10) Patent No.: US 12,295,045 B2
(45) Date of Patent: May 6, 2025

(54) METHOD AND APPARATUS FOR TRANSMITTING OR RECEIVING SIGNAL IN WIRELESS COMMUNICATION SYSTEM

(71) Applicant: LG Electronics Inc., Seoul (KR)

(72) Inventors: Seokmin Shin, Seoul (KR); Suckchel Yang, Seoul (KR); Seonwook Kim, Seoul (KR); Joonkui Ahn, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 17/601,165

(22) PCT Filed: Apr. 29, 2020

(86) PCT No.: PCT/KR2020/005657
§ 371 (c)(1),
(2) Date: Oct. 4, 2021

(87) PCT Pub. No.: WO2020/226339
PCT Pub. Date: Nov. 12, 2020

(65) Prior Publication Data
US 2022/0174751 A1 Jun. 2, 2022

(30) Foreign Application Priority Data
May 3, 2019 (KR) ........................ 10-2019-0052586

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/0453* (2013.01); *H04W 74/004* (2013.01); *H04W 74/0866* (2013.01)

(58) Field of Classification Search
CPC ..... H04L 1/189; H04L 1/1893; H04L 1/1896; H04L 5/1469; H04W 72/0446;
(Continued)

(56) References Cited

U.S. PATENT DOCUMENTS

2019/0132882 A1* 5/2019 Li .................... H04W 74/0833
2020/0146054 A1* 5/2020 Jeon ................. H04W 74/0833
(Continued)

FOREIGN PATENT DOCUMENTS

CN          110312312 B   * 11/2022   .......... H04L 5/0048
KR          20170008665     1/2017

OTHER PUBLICATIONS

GAO, "Uplink Transmission Resource Obtaining Method, Data Transmission Method and Electronic Device," English Machine Translation of GAO (CN-110312312B), Clarivate Analytics, pp. 1-19 (Year: 2023).*

(Continued)

*Primary Examiner* — Marcus Smith
*Assistant Examiner* — Kai Chang
(74) *Attorney, Agent, or Firm* — Fish & Richardson P.C.

(57) ABSTRACT

A method and apparatus for transmitting or receiving a signal in a wireless communication system according to an embodiment of the present invention may comprise: transmitting message A including a physical random access channel (PRACH) and a physical uplink shared channel (PUSCH); and receiving message B on the basis of message A, wherein random access channel occasions (ROs) for transmission of the PRACH are located in a first slot, PUSCH occasions (POs) for transmission of the PUSCH are located in a second slot, and the first slot and the second slot are time-division multiplexed (TDMed) with each other.

12 Claims, 15 Drawing Sheets

(51) Int. Cl.
*H04W 72/0453* (2023.01)
*H04W 74/00* (2009.01)
*H04W 74/08* (2024.01)

(58) Field of Classification Search
CPC .......... H04W 72/0453; H04W 74/004; H04W 74/0833; H04W 74/0841; H04W 74/0866; H04W 74/0836; H04W 74/0838
See application file for complete search history.

(56) References Cited

U.S. PATENT DOCUMENTS

| | | | | |
|---|---|---|---|---|
| 2020/0267773 | A1* | 8/2020 | Islam | H04W 74/0833 |
| 2020/0314917 | A1* | 10/2020 | Jeon | H04W 74/08 |
| 2021/0160866 | A1* | 5/2021 | Zhang | H04W 72/0446 |
| 2021/0176789 | A1* | 6/2021 | Takahashi | H04B 7/088 |
| 2022/0070941 | A1* | 3/2022 | Farag | H04W 74/006 |
| 2022/0078853 | A1* | 3/2022 | Christoffersson | H04W 74/0833 |
| 2022/0132583 | A1* | 4/2022 | Ko | H04L 1/00 |
| 2022/0132595 | A1* | 4/2022 | Ko | H04W 74/0866 |
| 2022/0201766 | A1* | 6/2022 | Gao | H04W 72/0453 |

OTHER PUBLICATIONS

Huawei & HiSilicon, "Initial access signal and channels in NR unlicensed band," R1-1901522, Presented at 3GPP TSG AN WG1 Meeting #96, Athens, Greece, Feb. 25-Mar. 1, 2019, 15 pages.

International Search Report and Written Opinion in International Appln. No. PCT/KR2020/005657, dated Aug. 11, 2020, 17 pages (with English translation).

LG Electronics, "Channel Structure for Two-Step RACH," R1-1904196, Presented at 3GPP TSG RAN WG1 Meeting #96bis, Xi'an, China, Apr. 8-12, 2019, 8 pages.

LG Electronics, "Initial access and mobility for NR unlicensed operation," R1-1808508, Presented at 3GPP TSG RAN WG1 Meeting #94, Gothenburg, Sweden, Aug. 20-24, 2018, 12 pages.

Sierra Wireless, "Channel Structure for Two-Step RACH Considerations," R1-1902133, Presented at 3GPP TSG RAN WG1 #96, Athens, Greece, Feb. 25-Mar. 1, 2019, 5 pages.

Vivo, "Discussion on initial access signals and channels," R1-1900107, Presented at 3GPP TSG RAN WG1 Ad-Hoc Meeting 1901, Taipei, Jan. 21-25, 2019, 8 pages.

\* cited by examiner (a) Carrier aggregation between L-band and U-band (b) Standalone U-band(s)

(a)

(b)

(a)

(b)

(a)

(b)

METHOD AND APPARATUS FOR TRANSMITTING OR RECEIVING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2020/005657, filed on Apr. 29, 2020, which claims the benefit of Korean Application No. 10-2019-0052586, filed on May 3, 2019. The disclosures of the prior applications are incorporated by reference in their entirety.

TECHNICAL FIELD

The present disclosure relates to a method and apparatus for use in a wireless communication system, and more particularly, to a random access method for use in a wireless communication system and apparatus therefor.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

Provided are a method and apparatus for performing a random access procedure efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Provided are a method and apparatus in a wireless communication system.

In an aspect of the present disclosure, a method of transmitting and receiving a signal by a user equipment (UE) in a wireless communication system is provided. The method may include: transmitting a message A including a physical random access channel (PRACH) and a physical uplink shared channel (PUSCH); and receiving a message B based on the message A. Random access channel occasions (ROs) for transmission of the PRACH may be located in a first slot, and PUSCH occasions (POs) for transmission of the PUSCH may be located in a second slot. The first slot and the second slot may be time division multiplexed (TDMed) with each other.

In another aspect of the present disclosure, a communication apparatus (UE) configured to transmit and receive a signal in a wireless communication system is provided. The communication apparatus (UE) may include: at least one transceiver; at least one processor; and at least one memory operably connected to the at least one processor and configured to store instructions that, when executed, cause the at least one processor to perform operations including: transmitting a message A including a PRACH and a PUSCH; and receiving a message B based on the message A. ROs for transmission of the PRACH may be located in a first slot, and POs for transmission of the PUSCH may be located in a second slot. The first slot and the second slot may be TDMed with each other.

In another aspect of the present disclosure, a method of transmitting and receiving a signal by a base station in a wireless communication system is provided. The method may include: receiving a message A including a PRACH and a PUSCH; and transmitting a message B based on the message A. ROs for transmission of the PRACH may be located in a first slot, and POs for transmission of the PUSCH may be located in a second slot. The first slot and the second slot may be TDMed with each other.

In another aspect of the present disclosure, a communication apparatus (base station) configured to transmit and receive a signal in a wireless communication system is provided. The communication apparatus (base station) may include: at least one transceiver; at least one processor; and at least one memory operably connected to the at least one processor and configured to store instructions that, when executed, cause the at least one processor to perform operations including: receiving a message A including a PRACH and a PUSCH; and transmitting a message B based on the message A. ROs for transmission of the PRACH may be located in a first slot, and POs for transmission of the PUSCH may be located in a second slot. The first slot and the second slot may be TDMed with each other.

In another aspect of the present disclosure, an apparatus for a UE is provided. The apparatus may include: at least one processor; and at least one computer memory operably connected to the at least one processor and configured to store instructions that, when executed, cause the at least one processor to perform operations including: transmitting a message A including a PRACH and a PUSCH; and receiving a message B based on the message A. ROs for transmission of the PRACH may be located in a first slot, and POs for transmission of the PUSCH may be located in a second slot. The first slot and the second slot may be TDMed with each other.

In a further aspect of the present disclosure, a computer readable storage medium configured to store at least one computer program that, when executed, cause at least one processor to perform operations. The operations may include: transmitting a message A including a PRACH and a PUSCH; and receiving a message B based on the message A. ROs for transmission of the PRACH may be located in a first slot, and POs for transmission of the PUSCH may be located in a second slot. The first slot and the second slot may be TDMed with each other.

In the methods and apparatuses, the PRACH may be configured with length-139 sequences repeatedly mapped in a frequency domain or a single long sequence contiguously mapped in the frequency domain.

In the methods and apparatuses, the PUSCH may be interlaced at a physical resource block (PRB) level in the frequency domain.

In the methods and apparatuses, a time interval may exist between the ROs included in the first slot.

In the methods and apparatuses, a time interval may exist between the POs included in the second slot.

In the methods and apparatuses, the PRACH may be transmitted on an RO located last in a time domain within the first slot, and the PUSCH may be transmitted on a PO located first in the time domain within the second slot.

In the methods and apparatuses, one RO among the ROs may be related to a plurality of POs among the POs.

In the methods and apparatuses, the communication apparatuses may include an autonomous driving vehicle communicable with at least a user equipment (UE), a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication device may perform a random access procedure more efficiently by an operation differentiated from a legacy operation.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)

Figure 1:
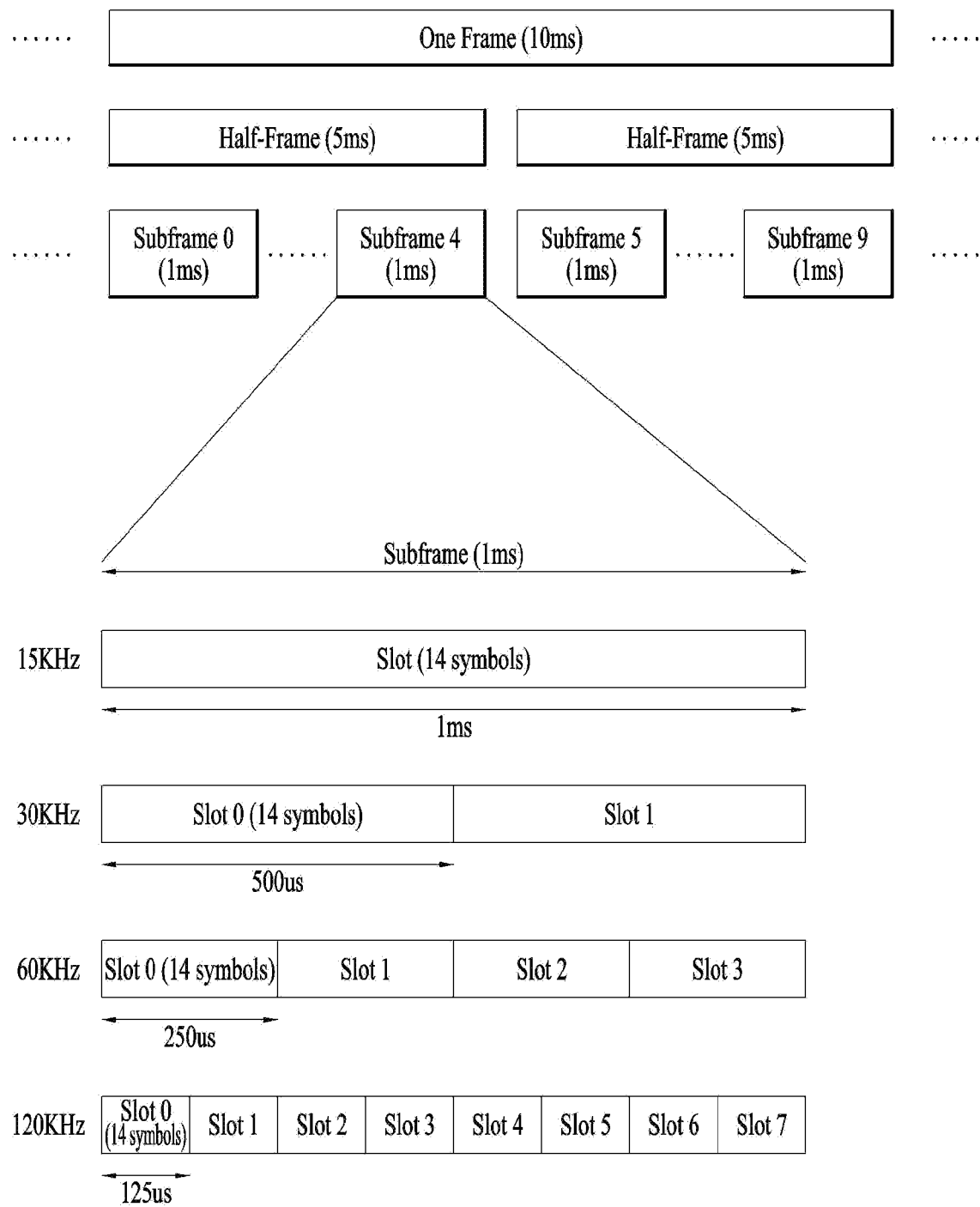
FIG. 1 illustrates a radio frame structure.

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15 * 2^u) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N_{symb}^{slot}$: number of symbols in a slot
* $N_{slot}^{frame,u}$: number of slots in a frame
* $N_{slot}^{subframe,u}$: number of slots in a subframe Table 2 illustrates that the number of symbols per slot, the number of slots per frame, and the number of slots per subframe vary according to SCSs in an extended CP case.

TABLE 2

| SCS (15 * 2^u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 2:
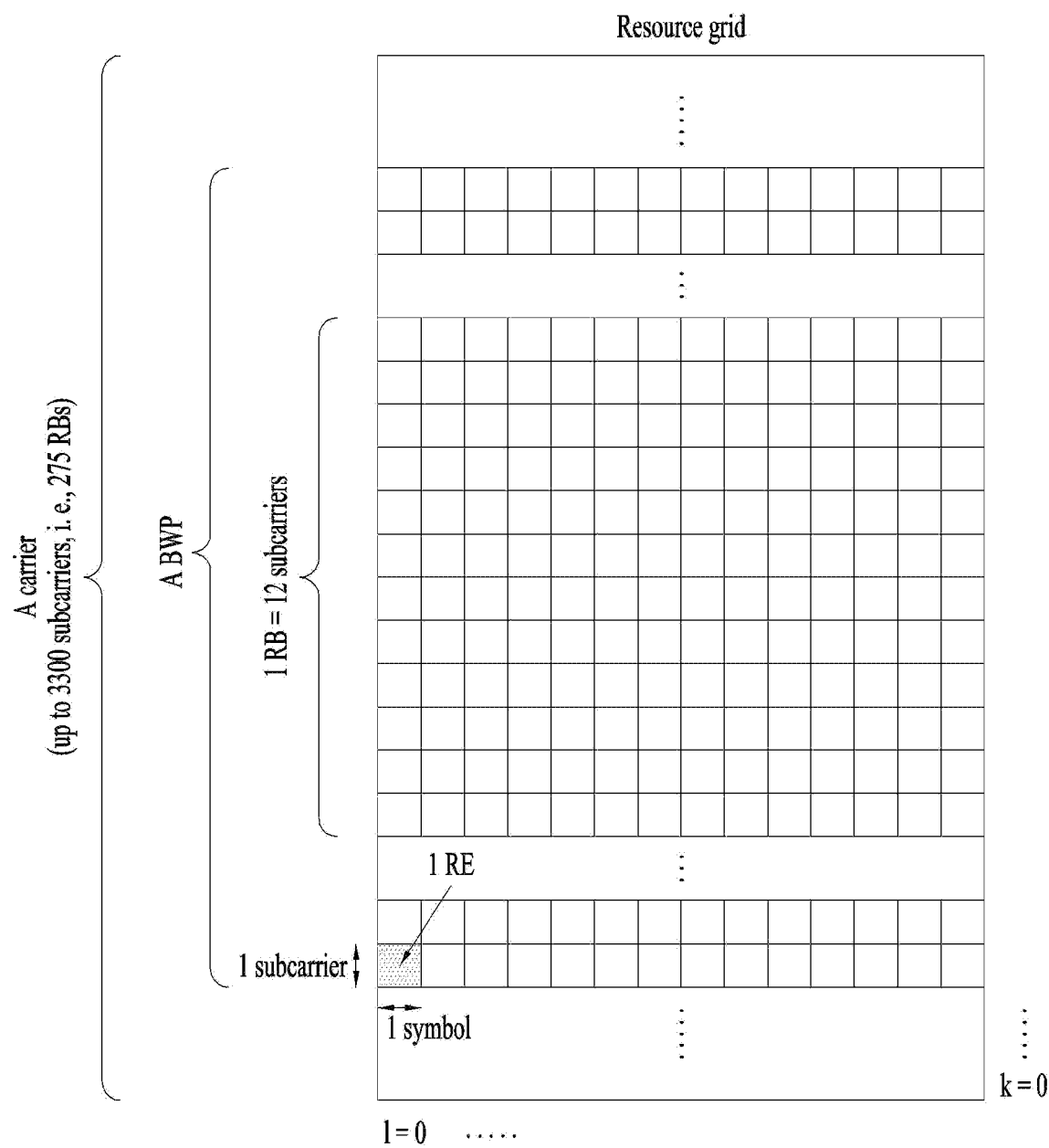
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 3:
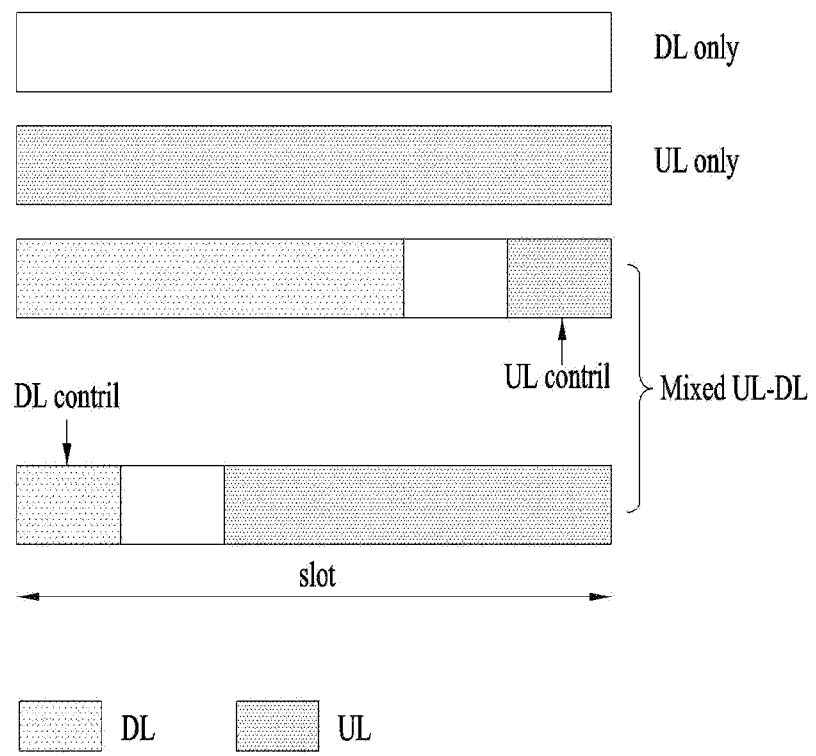
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration

DL region+Guard period (GP)+UL control region

DL control region+GP+UL region

DL region: (i) DL data region, (ii) DL control region+DL data region

UL region: (i) UL data region, (ii) UL data region+UL control region

The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

1. Wireless Communication System Supporting Unlicensed Band

Figure 4:
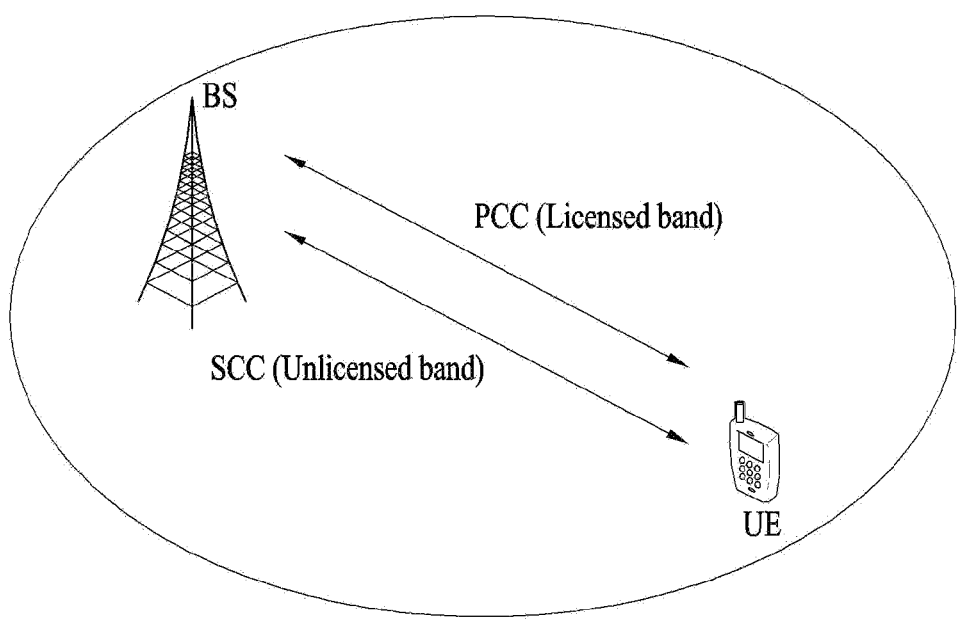
FIG. 4 illustrates a wireless communication system supporting an unlicensed band.
Figure 4:
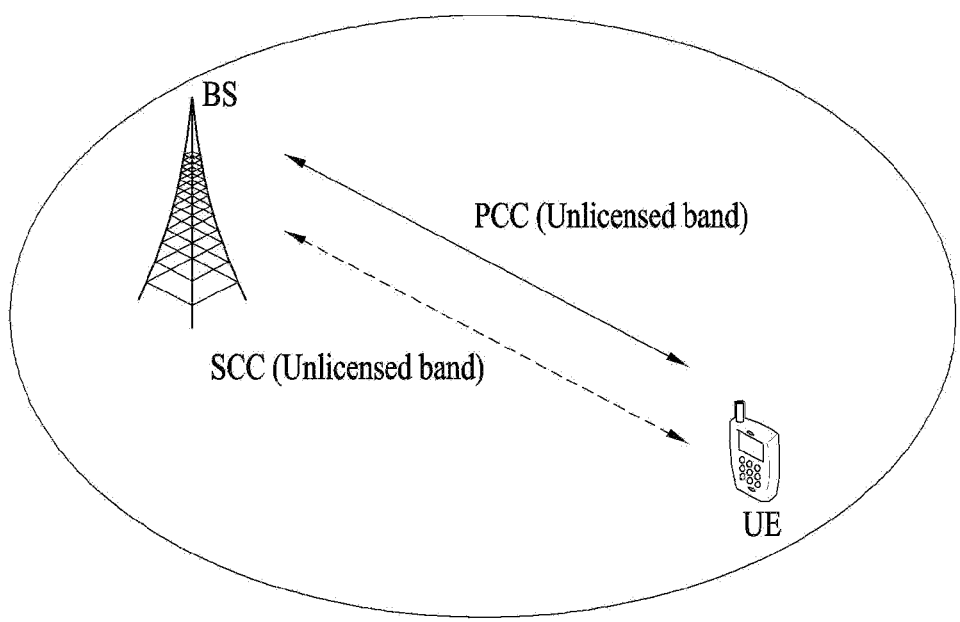

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 4(*a*), the LCC may be configured as a primary CC (PCC) and the UCC may be configured as a secondary CC (SCC). As illustrated in FIG. 4(*b*), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G system named New RAT (NR). The NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, subcarrier spacing (SCS), and so on). In recent years, data traffic has significantly increased with the advent of smart devices. Thus, the 3GPP NR system has also considered the use of an unlicensed band for cellular communication as in LAA of the legacy 3GPP LTE system. However, unlike the LAA, a NR cell in the unlicensed-band (NR U-cell) aims to support standalone operation. For example, PUCCH, PUSCH, and PRACH transmissions at the UE may be supported.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

Figure 5:
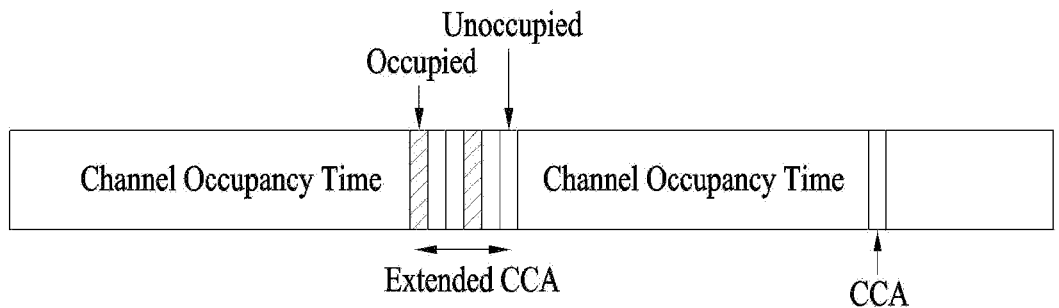
FIG. 5 illustrates a method of occupying resources in an unlicensed band.

FIG. 5 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.
Method of Transmitting DL Signal in Unlicensed Band To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP Method

Figure 6:
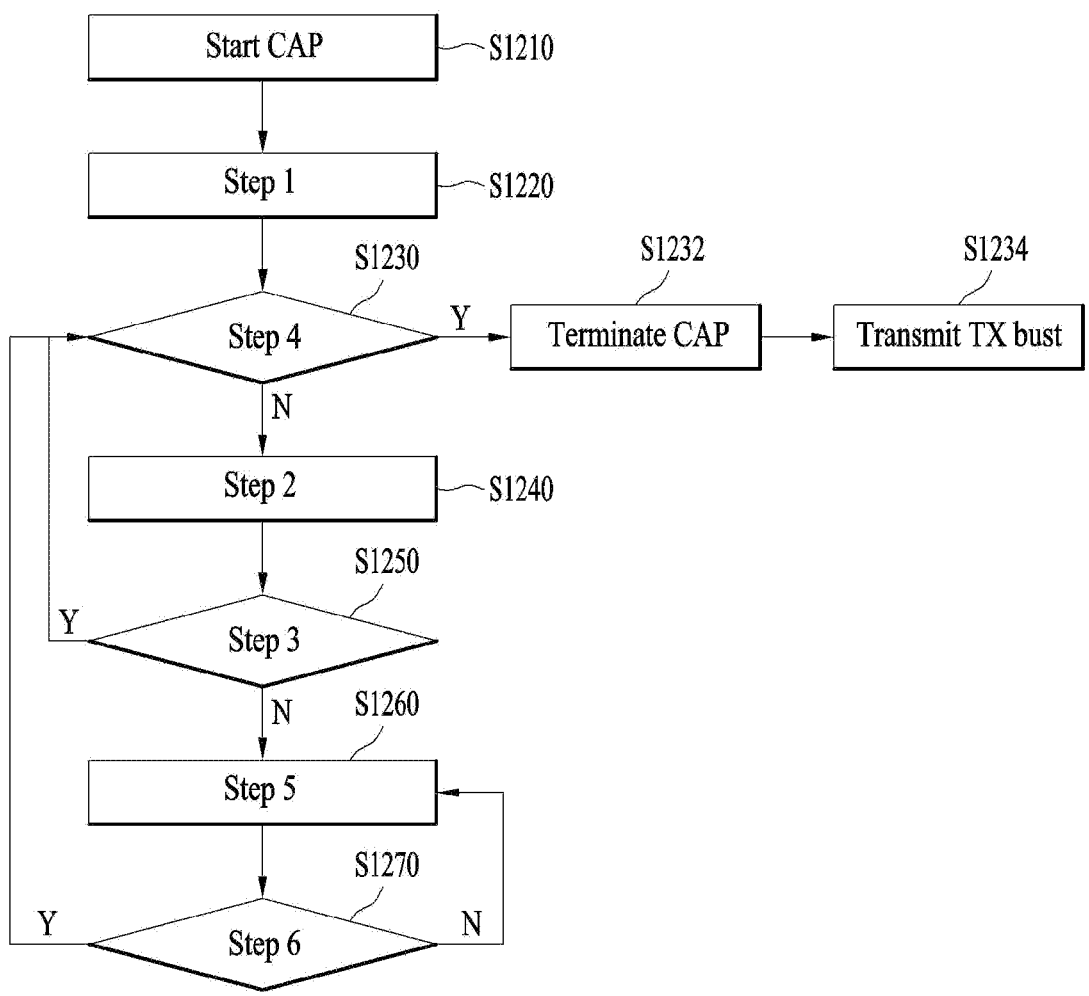
FIGS. 6 and 7 are flowcharts illustrating channel access procedures (CAPs) for signal transmission in an unlicensed band.

FIG. 6 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value $N_{init}$ (S1220). $N_{init}$ is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration $T_d$. (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 3 illustrates that mp, a minimum CW, a maximum CW, a maximum channel occupancy time (MCOT), and an allowed CW size applied to a CAP vary according to channel access priority classes.

TABLE 3

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {3, 7} |

TABLE 3-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 7:
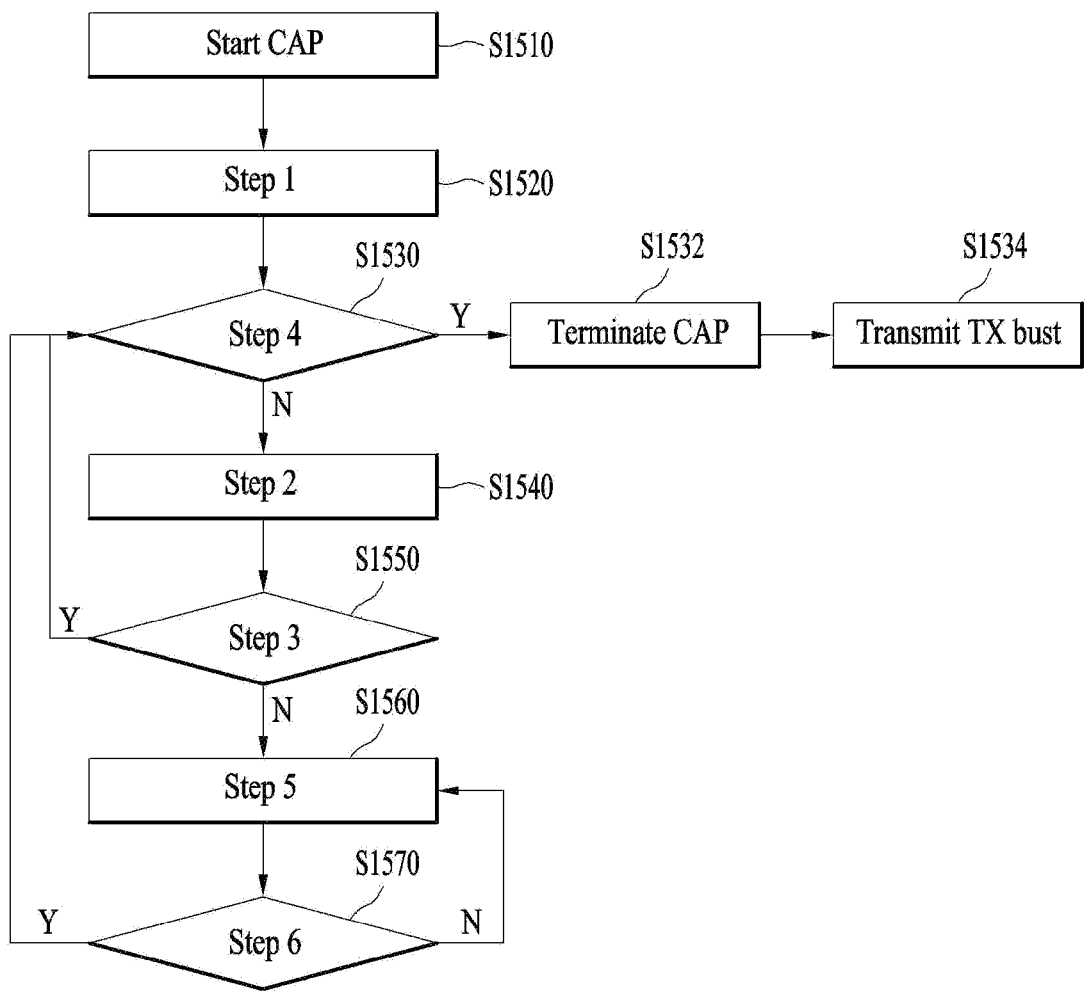

FIG. 7 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 4 shows that the values of mp, a minimum CW, a maximum CW, a maximum channel occupancy time (MCOT), and allowed CW sizes, which are applied to the CAP, vary depending on channel access priority classes.

TABLE 4

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14'indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,\ p}$ for every priority class p∈{1,2,3,4}. Otherwise, the UE may increase $CW_p$ for every priority class p∈{1,2,3,4} to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0$, $n_1, \ldots n_w$, starting from the subframe (or slot) $n_0$ without a gap (the subframe (or slot) $n_w$ is the most recent subframe (or slot) before a subframe (or slot) $n_g$–3 in which the UE has transmitted a UL-SCH based on a Type 1 CAP), the reference subframe (or slot) $n_{ref}$ is the subframe (or slot) $n_0$.

(2) Type 2 UL CAP Method

Figure 8:
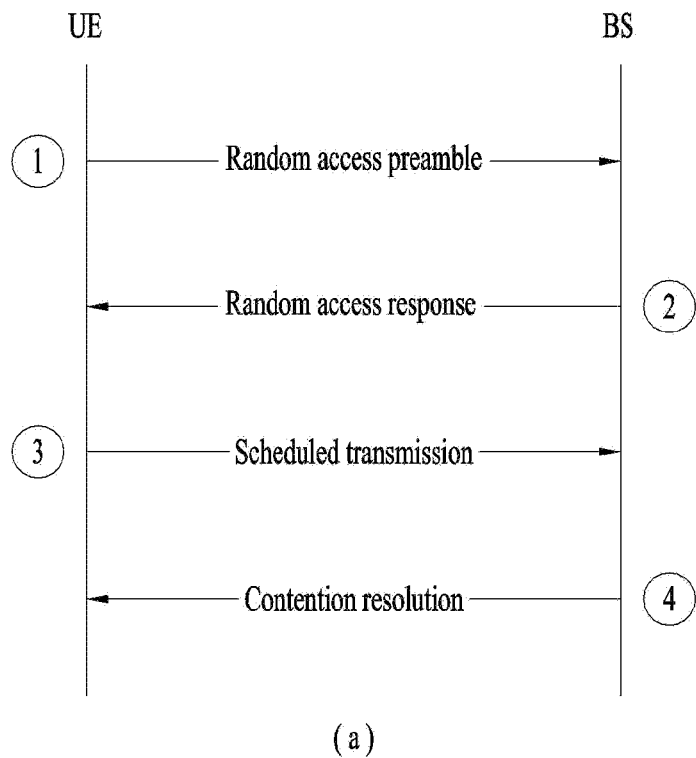
FIGS. 8 and 9 are a diagram illustrating a signal flow for a random access procedure.
Figure 8:
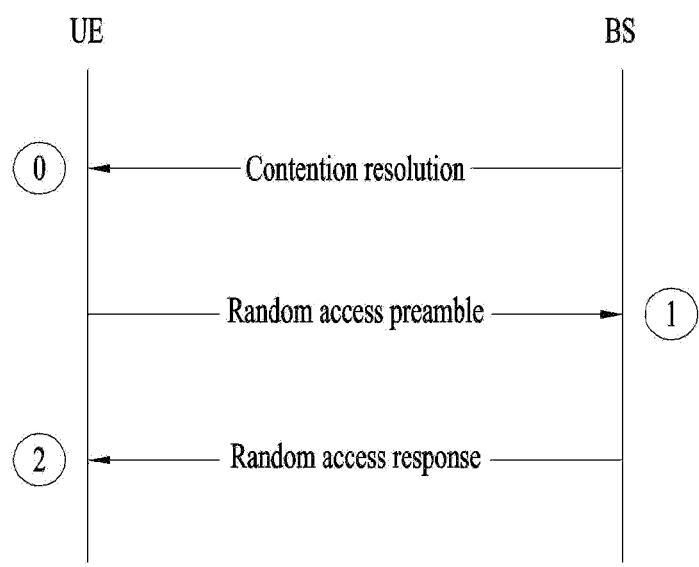

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration Tsl of 9 us. Tf includes an idle slot duration Tsl at the start thereof 2. Random Access Procedure FIG. 8 illustrates random access procedures. FIG. 8(a) illustrates the contention-based random access procedure, and FIG. 8(b) illustrates the dedicated random access procedure.

Referring to FIG. 8(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-ResponseWindow). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE. The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC Setup message). When information transmitted in Msg3 does not match information received in Msg4, or when the UE has not received Msg4 for a predetermined time, the UE may retransmit Msg3, determining that the contention resolution has failed.

Referring to FIG. 8(b), the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.
Step 1: The UE transmits the RACH preamble on a PRACH.
Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell. When the CRC of DCI format 1_0 is scrambled with a C-RNTI, and all bits of a "Frequency domain resource assignment" field are 1s, DCI format 1_0 is used as a PDCCH order indicating a random access procedure. In this case, the fields of DCI format 1_0 are configured as follows.
RA preamble index: 6 bits
UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.
SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.
PRACH mask index: 4 bits. When the bits of the RA preamble index are all non-zeroes, the PRACH mask index indicates an RACH occasion associated with the SSB indicated by the SSB index. Otherwise, it is reserved.
Reserved: 10 bits When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ feedback timing indicator, and so on).

2-Step Random Access Procedure

In the prior art, random access is performed by a 4-step procedure as described above. In the legacy LTE system, an average of 15.5 ms is required for the 4-step random access procedure.

TABLE 5

| Component | Description | Time (ms) |
|---|---|---|
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL want) | 1 |

The NR system may require lower latency than conventional systems. When random access occurs in a U-band, the random access may be terminated, that is, contention may be resolved only if the UE and BS sequentially succeed in LBT in all steps of the 4-step random access procedure. If the LBT fails even in one step of the 4-step random access procedure, resource efficiency may decrease, and latency may increase. If the LBT fails in a scheduling/transmission process associated with Msg2 or Msg3, the resource efficiency may significantly decrease, and the latency may significantly increase. For random access in an L-band, low latency may be required in various scenarios of the NR system. Therefore, a 2-step random access procedure may be performed in the L-band as well.

To reduce latency in a random access procedure, the 2-step random access procedure may be used in the present disclosure.

As illustrated in FIG. 9(a), the 2-step random access procedure may include two steps: transmission of a UL signal (referred to as MsgA) from the UE to the BS and transmission of a DL signal (referred to as MsgB) from the BS to the UE.

The following description focuses on the initial access procedure, but the proposed methods may be equally applied to the random access procedure after the UE and BS establish an RRC connection. Further, a random access preamble and a message 3 PUSCH (Msg3 PUSCH) may be transmitted together in a non-contention random access procedure as shown in FIG. 9(b). In the present disclosure, the Msg3 PUSCH may mean not only Msg3 transmitted in the 4-step random access procedure but also a PUSCH that is included in transmission of MsgA in the 2-step random access procedure and transmitted together with a PRACH. In the present disclosure, the PUSCH included in the transmission of MsgA in the 2-step random access procedure and transmitted together with the PRACH may be referred to as a PUSCH part.

While not shown, the BS may transmit a PDCCH for scheduling MsgB to the UE, which may be referred to as an MsgB PDCCH.

Figure 9:
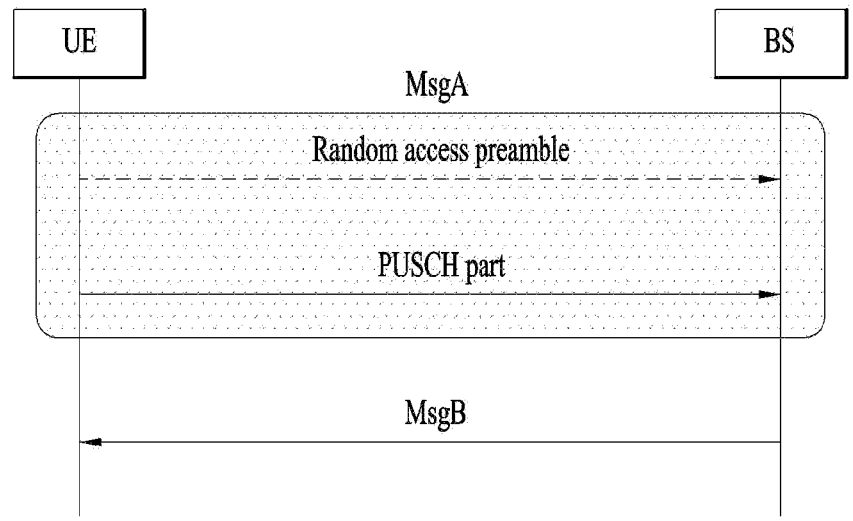
Figure 9:
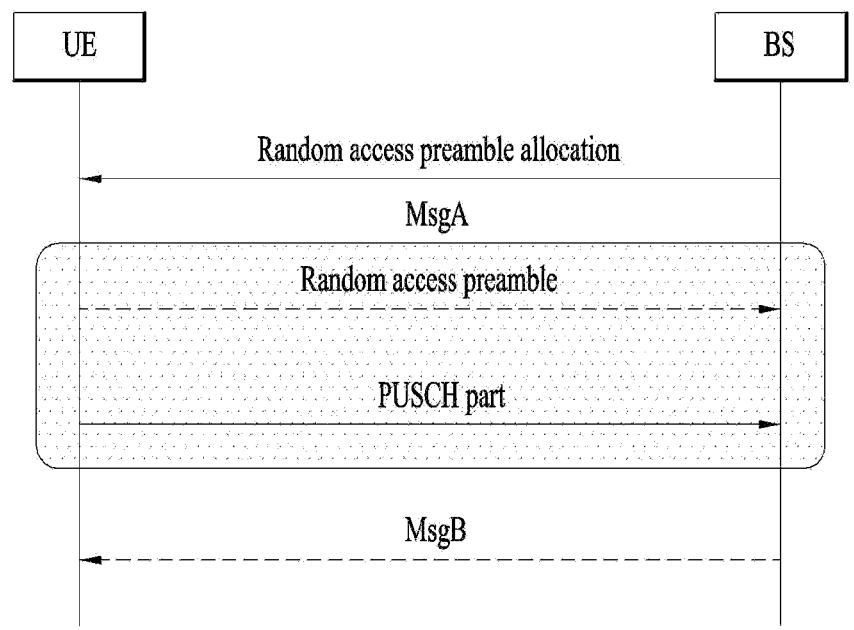

MsgA for the 2-step random access procedure may be obtained by combining a random access preamble and a PUSCH part as shown in FIG. 9. The random access preamble and PUSCH part may be combined by time division multiplexing (TDM) or frequency division multiplexing (FDM).

The following parameters are related to MsgA.
RO (RACH Occasion): the RO refers to time and frequency resources available for transmission of a random access preamble.
PI (Preamble Index): the PI means the index of a random access preamble distinguishable by a sequence for one RO. The PI may be identified by an RAPID.
PO (PUSCH Occasion): The PO means time and frequency resources available for transmission of a PUSCH part.

3. Physical Random Access Channel (PRACH) Transmission in U-Band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

In addition, PRACH preamble design related methods, which will be described later, are related to UL transmission, and thus, the methods may be equally applied to the UL signal transmission methods in the U-band system described above. To implement the present disclosure in systems, the technical idea of the present disclosure may be modified so that the idea is matched with terms, expressions, and structures defined in each system.

For example, UL transmission based on the PRACH preamble design related methods may be performed in an L-cell and/or U-cell defined in the U-band system.

The Wi-Fi standard (802.11ac) specifies a CCA threshold of −62 dBm for non-Wi-Fi signals and a CCA threshold of −82 dBm for Wi-Fi signals. In other words, if a station (STA) or access point (AP) of the Wi-Fi system transmits no signal in a specific band if the STA or AP receives a signal from a device not included in the Wi-Fi system in the specific band at a power of −62 dBm or higher.

PRACH formats may include a long RACH format and a short RACH format. A PRACH with the long RACH format is configured with a length-839 sequence. A PRACH with the short RACH format is configured with a length-139 sequence.

When a specific device (and/or node) transmits a signal in a U-band, there may be restrictions in terms of power spectral density (PSD). For example, according to the ETSI regulation, signal transmission in a specific band needs to satisfy a PSD of 10 dBm/1 MHz. If a PRACH is transmitted based on the structure shown in FIG. 10 in an SCS of 15 kHz, the maximum allowable power for the PRACH may be about 14 dBm by considering that the bandwidth is about 2.1 MHz. In general, the maximum power of the UE is 23 dBm, and the maximum allowable power of 14 dBm is significantly lower than 23 dBm. If the UE transmits a UL signal at 14 dBm, the maximum UL coverage supported by the UE may be reduced. If the UE transmits the PRACH in a wide frequency domain (F-domain) rather than 14 consecutive RBs to increase the transmit power, it may help to solve the problem that the UL coverage becomes small. As regulations in U-bands, there may be restrictions in terms of occupied channel bandwidth (OCB). For example, when a specific device transmits a signal, the signal may need to occupy at least 80% of the system bandwidth. If the system bandwidth is 20 MHz, the signal transmitted by the specific device may need to occupy more than 16 MHz, which is 80% of 20 MHz.

Hereinafter, the structure of a PRACH preamble in consideration of the PSD and OCB regulations will be described. Specifically, the present disclosure proposes to combine the waveform of a PRACH preamble corresponding to MsgA of the 2-step random access procedure and the waveform of a PUSCH part. In addition, if there is no timing gap between ROs in a RACH slot as in the legacy communication system, the following problem may be caused. In a NR-U situation where a UE performs LBT operation before UL transmission, since there are other UEs intending to perform PRACH transmission on a specific RO in the same cell, the other UEs may not use subsequent ROs. Similarly, there may be a situation in which other UEs may not use subsequent POs because the other UEs intend to transmit a PUSCH part on a specific PO. Therefore, the present disclosure proposes a method of configuring a timing gap between RACH slots and/or PUSCH slots in an NR unlicensed environment.

The methods proposed in the present disclosure may be applied to other use cases besides the NR U-band. For example, the methods proposed in the present disclosure may be used for an NR-based non-terrestrial network (NTN).

3.1 Method of Combining Waveforms Used for PRACH Preamble and PUSCH Part

Figure 10:
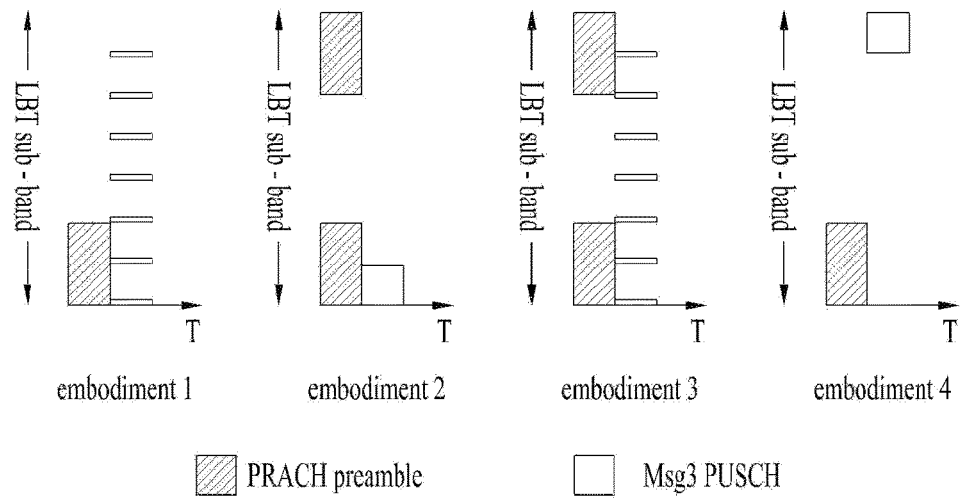
FIGS. 10 to 16 illustrates random access procedures according to an embodiment of the present disclosure.

To satisfy OCB requirements in NR-U, frequency domain sequence repetition mapping may be applied to a PRACH. In other words, a length-139 sequence may be repeatedly mapped in the frequency domain. Alternatively, the PRACH may be configured with one long sequence contiguously mapped (single long sequence with contiguous mapping). The single long sequence with contiguous mapping may have a minimum length capable of satisfying the OCB requirements based on the SCS value. For example, the length of the single long sequence with contiguous mapping may be set to 571 in an SCS of 30 kHz and 1151 in an SCS of 15 kHz. PRB level interlaced mapping may be applied to a PUSCH. The PRACH structure based on frequency domain sequence repetition mapping described and illustrated in the present disclosure and accompanying drawings may be interpreted as the single long sequence with contiguous mapping. FIG. 10 illustrates an exemplary combination of a PRACH preamble and a PUSCH part available in the 2-step random access procedure.

(Embodiment 1) Combination of PRACH of Legacy System and PRB Level Interlaced PUSCH [Rel-15 NR PRACH+PRB Level Interlaced PUSCH]

For the PRACH of the legacy communication system, a single PRACH sequence is mapped to 12 consecutive PRBs in the frequency domain (i.e., 2160 kHz for 15 kHz SCS and 4320 kHz for 30 kHz SCS), and thus it does not satisfy 16000 kHz, which is 80% of a 20 MHz LBT sub-band. That is, the PRACH of the legacy system may not satisfy the OCB requirements. Accordingly, as in Embodiment 1 of FIG. 10, the RO of MsgA may be configured/transmitted in the form of the PRACH of the legacy system, and the PO of MsgA related to the RO may be configured/transmitted in the form of a PRB level interlaced PUSCH.

According to Embodiment 1, the same number of ROs as the PRACH of the legacy communication system may be configured.

(Embodiment 2) Combination of PRACH Repeatedly Mapped in Frequency Domain Sequence (or PRACH with Single Long Sequence with Contiguous Mapping) and PUSCH of Legacy System [Frequency Domain Sequence Repetition PRACH (or Single Long Sequence PRACH)+Rel-15 NR PUSCH]

In the case of a PRACH repeatedly mapped on a frequency domain sequence (or a PRACH with a single long sequence with contiguous mapping), a plurality of PRACH sequences that are repeated in the frequency domain are mapped/defined to satisfy the OCB requirements. Therefore, as in Embodiment 2 of FIG. 10, the RO of MsgA is configured/transmitted in the form of a sequence repetition PRACH or long sequence PRACH, and the PO of MsgA related to the RO may be configured/transmitted in the form of the PUSCH of the legacy system, which is mapped to consecutive PRB(s) in the frequency domain.

According to Embodiment 2, a smaller number of ROs than the PRACH of the legacy communication system may be configured.

(Embodiment 3) Combination of PRACH Repeatedly Mapped in Frequency Domain Sequence (or PRACH with Single Long Sequence with Contiguous Mapping) and PRB Level Interlaced PUSCH [Frequency Domain Sequence Repetition PRACH (or Single Long Sequence PRACH)+PRB Level Interlaced PUSCH]

As in Embodiment 3 of FIG. 10, transmission may be performed in a form specific to NR-U for both a PRACH and a PUSCH. That is, a PRACH repeatedly mapped on a frequency domain sequence (or a PRACH with a single long sequence with contiguous mapping) may be transmitted, and then a PUSCH part may be transmitted in the form of a PRB level interlaced PUSCH in the time domain. In other words, the RO of MsgA may be configured/transmitted in the form of a sequence repetition mapping PRACH, and the PO of MsgA related to the RO may be configured/transmitted in the form of the PRB level interlaced PUSCH.

According to Embodiment 3, a smaller number of ROs than the PRACH of the legacy system may be configured.

(Embodiment 4) Frequency Hopping of PRACH of Legacy System and PUSCH of Legacy System [Rel-15 NR PRACH+Rel-15 NR PUSCH with Frequency Hopping]

Both the PRACH and PUSCH of the legacy system may not satisfy the OCB requirements. Therefore, when the two channels: PRACH and PUSCH are hopping on different frequencies, the OCB requirements may be satisfied. For example, when the SCS of a PRACH preamble is 30 kHz, a total of four ROs may be defined in a 20 MHz LBT sub-band. According to the method of Embodiment 4, only an RO on the lowest frequency and an RO on the highest frequency in the subband may be used for the PRACH. The PUSCH may be determined depending on the transmission band of the RO (e.g., opposite positions). That is, the RO of MsgA may be configured/transmitted in the form of the PRACH of the legacy system, and the PO of MsgA related to the RI may be configured/transmitted in the form of the PUSCH of the legacy system. The frequency band occupied by the RO and PO combination (e.g., the interval between the lowest and highest frequencies to which two signals/resources are mapped) may be configured/set to be more than or equal to Z % (e.g., Z=80) of the nominal BW.

According to Embodiment 4, a smaller number of ROs than the PRACH of the legacy system may be configured. Also, a specific RO may not be used for the 2-step random access procedure. Accordingly, the RO that is not used for the 2-step random access procedure may exist as a dedicated RO for the 4-step random access procedure. Thus, according to Embodiment 4, only the 4-step random access procedure may be performed on two ROs among the four ROs.

In Embodiments 1 to 4, a PO may be one-to-one or one-to-N paired with a specific RO and/or RAPID.

3.2. Time/Frequency Resource Mapping Method Between PRACH Preamble and PUSCH Part Hereinafter, a method of mapping a PRACH preamble and a PUSCH part to time and/or frequency resources will be described based on the combination of waveforms for transmitting the PRACH preamble part of MsgA and the PUSCH part described in Section 3.1.

(Option 1) an RO and PO corresponding to/configured for single/same MsgA are multiplexed in the frequency domain, and a timing gap is configured between MsgA configured with frequency division multiplexed (FDMed) RO/PO and different MsgA configured by TDM (configured with FDMed RO/PO).

Figure 11:
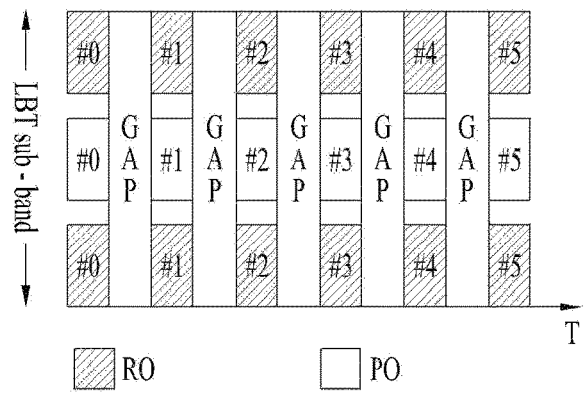
Figure 11:
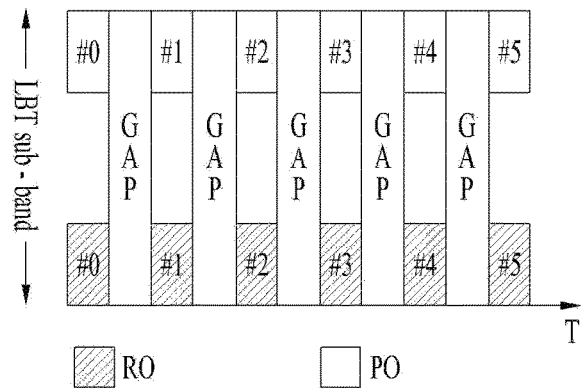

According to Option 1, the LBT procedure may be performed only once for MsgA transmission due to FDM of the RO and the PO. In addition, a larger number of ROs/POs may be located in a slot in which the RO and PO are transmitted, compared to other options. The MsgA structure of Option 1 may be established based on Embodiment 2 or Embodiment 4 among the embodiments described in Section 3.1. FIG. 11(a) illustrates the MsgA structure of Option 1 based on Embodiment 2, and FIG. 11(b) illustrates the MsgA structure of Option 1 based on Embodiment 4. Preferably, if Option 1 is implemented based on Embodiment 2, sequence repetition mapping may be performed in the frequency domain (sequence repetition in F-domain mapping) to perform FDM on the PRACH preamble and the PUSCH part. In the example of FIG. 11, an RO and PO having the same occasion number (e.g., #0, #1 . . . , etc. in FIG. 11) may be used together when the UE transmits MsgA in the 2-step random access procedure.

(Option 2) an RO and PO corresponding to/configured for single/same MsgA are time division multiplexed (TDMed) with no timing gap, and a timing gap is configured between MsgA configured with the RO/PO TDMed with no timing gap and different MsgA configured by TDM (configured with TDMed RO/PO).

Figure 12:
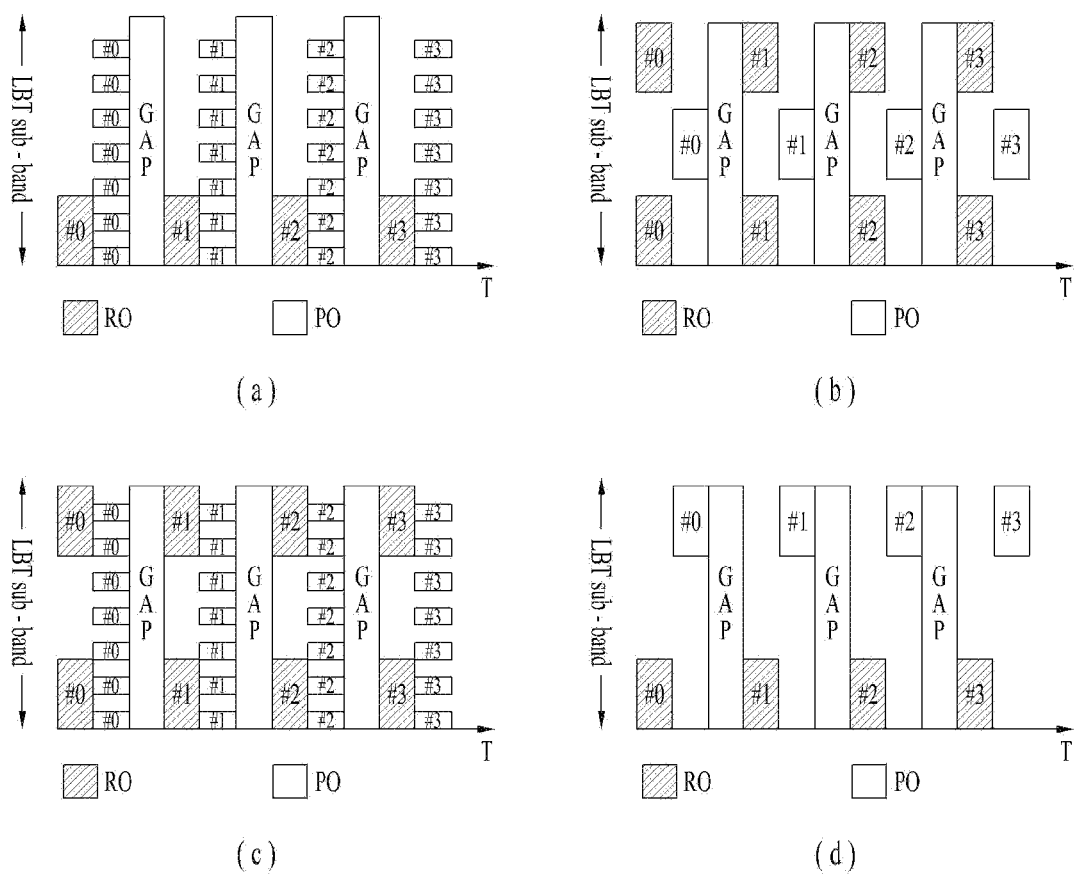

According to Option 2, the LBT procedure is performed only once for MsgA transmission due to TDM of the RO and the PO with no timing gap. The MsgA structure of Option 2 may be established based on all of the embodiments described in Section 3.1. FIG. 12(a) illustrates the MsgA structure of Option 2 based on Embodiment 1, FIG. 12(b) illustrates the MsgA structure of Option 2 based on Embodiment 2, FIG. 12(c) illustrates the MsgA structure of Option 2 based on Embodiment 3, and FIG. 12(d) illustrates the MsgA structure of Option 2 based on Embodiment 4. In the example of FIG. 12, an RO and PO having the same occasion number (e.g., #0, #1 ..., etc. in FIG. 12) may be used together when the UE transmits MsgA in the 2-step random access procedure.

(Option 3) an RO and PO corresponding to/configured for single/same MsgA are TDMed with a timing gap, and a timing gap is configured between MsgA configured with the RO/PO TDMed with the timing gap and different MsgA configured by TDM (configured with TDMed RO/PO).

According to Option 3, since the timing gap exists between the RO and PO, the LBT procedure is always required regardless of whether a PRACH preamble or PUSCH part is transmitted. Even if the UE transmits the PRACH preamble on RO #k (k is an arbitrary integer indicating the RO index), LBT may fail before PO #k (k is an arbitrary integer indicating the PO index). Thus, after the PRACH preamble is transmitted, a plurality of POs (TDMed POs) capable of transmitting the PUSCH part may be configured in relation to the RO where the preamble is transmitted.

In other words, the combination of the RO and PO corresponding to/configured for single/same MsgA may be configured such that a PO set including a plurality of (candidate) POs corresponds to one RO. The plurality of POs included in the corresponding PO set may be configured by TDM with the timing gap therebetween.

For example, after transmitting an RO, the UE attempts LBT sequentially from the earliest PO in time for a PO set corresponding to the transmitted RO. The UE may transmit a PUSCH part on a PO at the time when the LBT is first successful.

In another example, after transmitting an RO, the UE randomly selects one of a plurality of POs belonging to a PO set corresponding to the RO and attempts LBT only for the PO (if the LBT is successful, the UE may transmit a PUSCH part on the corresponding PO).

In a further example, when a PRACH preamble is transmitted on RO #k in RACH slot #n, a PUSCH part may be transmitted on up to M (e.g., M=3) POs from PO #k in the corresponding RACH slot. If there are no M POs from PO #k in the corresponding RACH slot, POs may be selected from PO #0 in the next RACH slot.

When the UE transmits a PRACH preamble, if the PRACH preamble is transmitted based on PRACH mapping of the legacy system, the UE may be desirable to transmit a PUSCH part in a PUSCH slot configured with a PRB level interlaced PUSCH. Alternatively, if the UE transmits a PUSCH of the legacy system in the same situation, the UE may be desirable to transmit a PUSCH part at a position capable of satisfying the OCB requirements.

Figure 13:
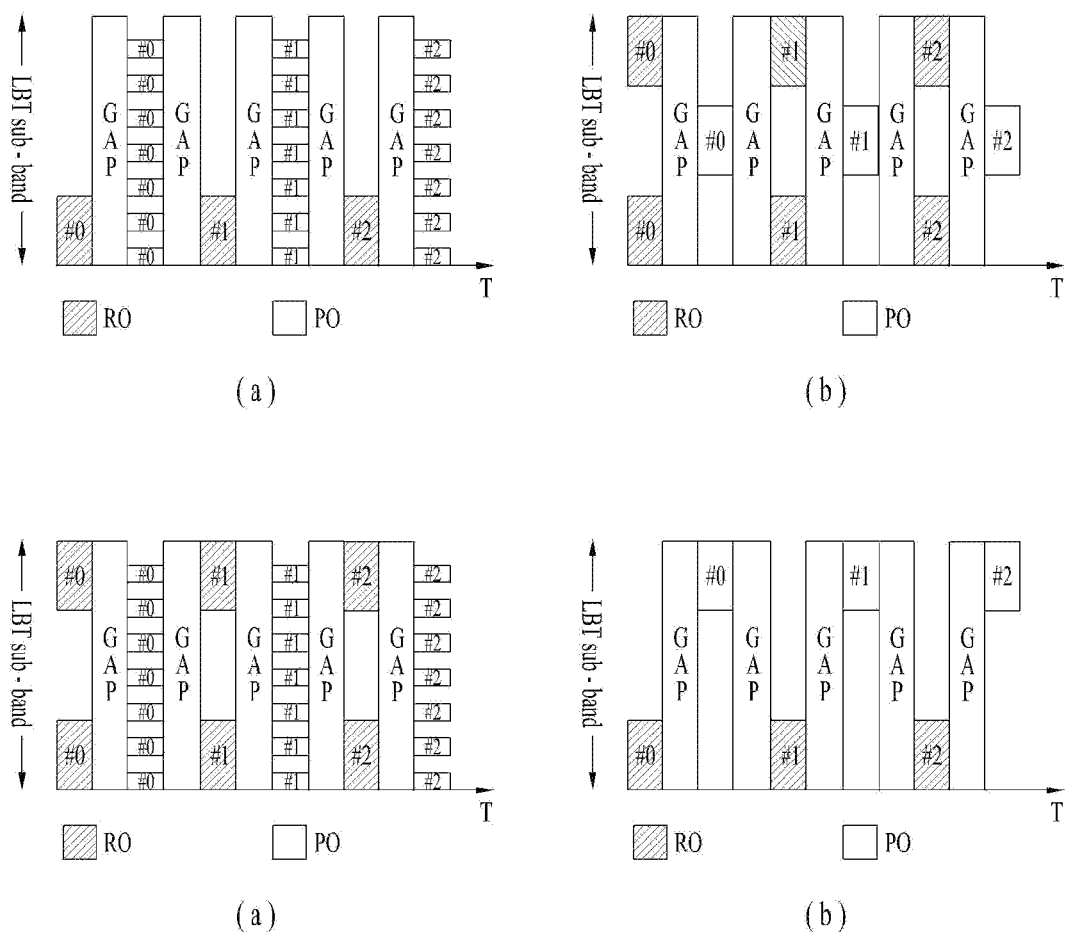

The MsgA structure of Option 3 may be established based on all of the embodiments described in Section 3.1. FIG. 13(a) illustrates the MsgA structure of Option 3 based on Embodiment 1, FIG. 13(b) illustrates the MsgA structure of Option 3 based on Embodiment 2, FIG. 13(c) illustrates the MsgA structure of Option 3 based on Embodiment 3, and FIG. 13(d) illustrates the MsgA structure of Option 3 based on Embodiment 4. In the example of FIG. 13, an RO and PO having the same occasion number (e.g., #0, #1 ..., etc. in FIG. 13) may be used together when the UE transmits MsgA in the 2-step random access procedure.

(Option 4) an RO and PO corresponding to/configured for single/same MsgA are TDMed at the slot level (i.e., a RACH slot including only ROs and a PUSCH slot including only POs are distinguished at the slot level), a timing gap is configured between ROs in the RACH slot, and a timing gap is configured between POs in the PUSCH slot.

According to Option 4, since there is a timing gap between ROs and there is a timing gap between POs, the LBT procedure is always required whether a PRACH preamble or a PUSCH part is transmitted. Even if the UE transmits the PRACH preamble on RO #k (k is an arbitrary integer indicating the RO index), LBT may fail before PO #k (k is an arbitrary integer indicating the PO index). Thus, after the PRACH preamble is transmitted, a plurality of POs (TDMed POs) capable of transmitting the PUSCH part may be configured in relation to the RO where the preamble is transmitted.

In other words, the combination of the RO and PO corresponding to/configured for single/same MsgA may be configured such that one RO (in a specific (RACH) slot) corresponds to a PO set including a plurality of (candidate) POs (in another (PUSCH) slot). The plurality of POs included in the PO set may be configured in the same (PUSCH) slot (such that the POs are TDMed with a timing gap). Alternatively, the plurality of POs may be configured/configured across a plurality of different (PUSCH) slots.

For example, after transmitting an RO, the UE attempts LBT sequentially from the earliest PO in time for a PO set corresponding to the transmitted RO. The UE may transmit a PUSCH part on a PO at the time when the LBT is first successful.

In another example, after transmitting an RO, the UE randomly selects one of a plurality of POs belonging to a PO set corresponding to the RO and attempts LBT only for the PO (if the LBT is successful, the UE may transmit a PUSCH part on the corresponding PO).

In a further example, when a PRACH preamble is transmitted on RO #k in RACH slot #n, a PUSCH part may be transmitted on up to M (e.g., M=3) POs in a next PUSCH slot from PO #k. If there are no M POs from PO #k in the corresponding PUSCH slot, POs may be selected from PO #0 in the corresponding PUSCH slot (or a next PUSCH slot). A PUSCH slot including POs capable of transmitting PUSCH parts may be referred to as an Msg3 PUSCH slot.

When the UE transmits a PRACH preamble, if the PRACH preamble is transmitted based on PRACH mapping of the legacy system, the UE may be desirable to transmit a PUSCH part in a PUSCH slot configured with a PRB level interlaced PUSCH. Alternatively, if the UE transmits a PUSCH of the legacy system in the same situation, the UE may be desirable to transmit a PUSCH part at a position capable of satisfying the OCB requirements.

Figure 14:
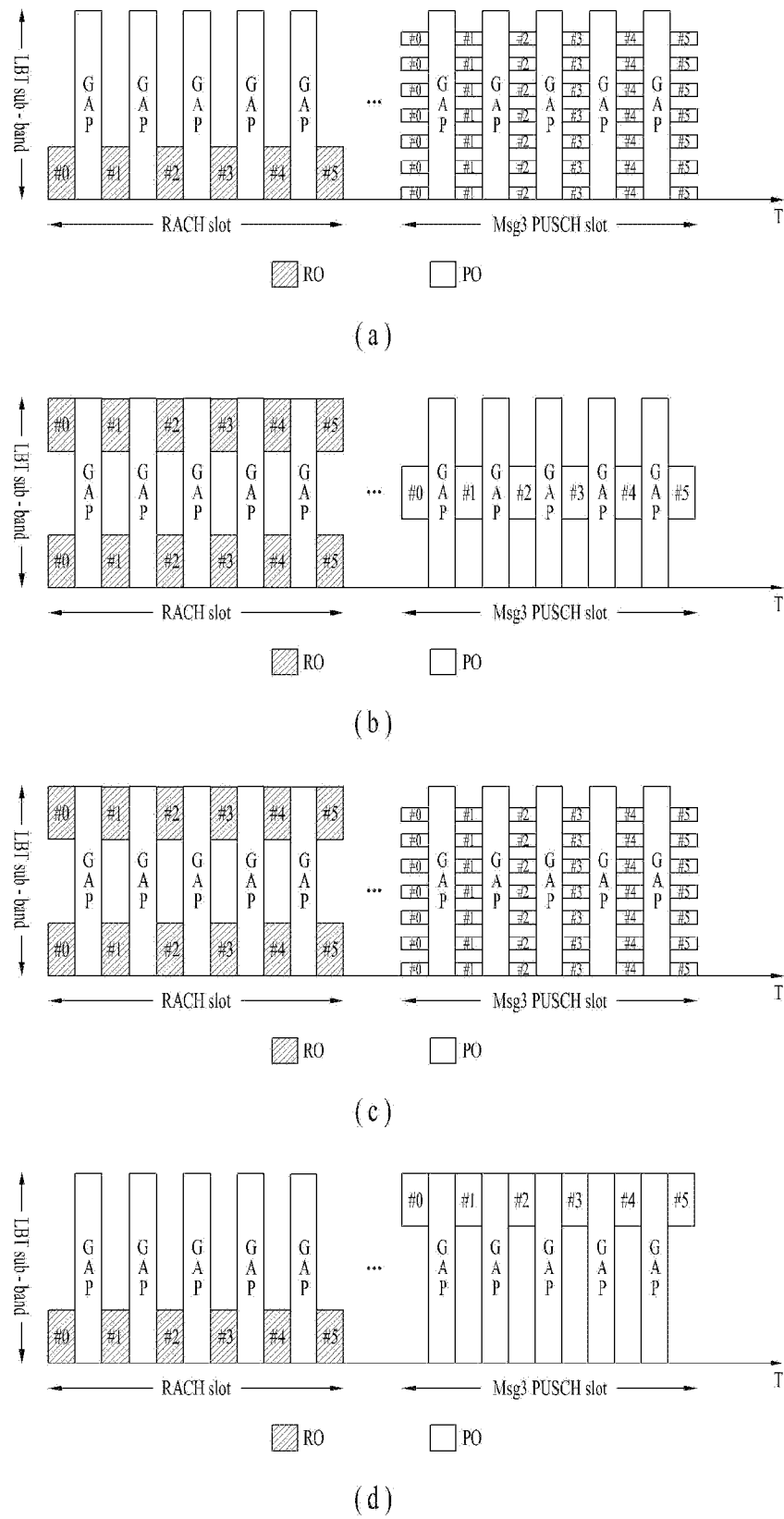

The MsgA structure of Option 4 may be established based on all of the embodiments described in Section 3.1. FIG. 14(a) illustrates the MsgA structure of Option 4 based on Embodiment 1, FIG. 14(b) illustrates the MsgA structure of Option 4 based on Embodiment 2, FIG. 14(c) illustrates the MsgA structure of Option 4 based on Embodiment 3, and FIG. 14(d) illustrates the MsgA structure of Option 4 based on Embodiment 4. In the example of FIG. 14, an RO and PO having the same occasion number (e.g., #0, #1 ..., etc. in FIG. 14) may be used together when the UE transmits MsgA in the 2-step random access procedure. Alternatively, MsgA may be configured by associating the last RO (e.g. RO #5) of a RACH slot and the first PO (e.g. PO #0) of a PUSCH slot. When the last RO of the RACH slot and the first PO of the PUSCH slot are associated to configure MsgA, the RO and PO constituting MsgA may be transmitted by a single LBT procedure.

The BS may indicate/configure to the UE whether the UE uses the corresponding embodiment/option or which embodiment/option the UE uses among the proposed methods through higher layer signaling (e.g., SIB, RMSI, etc.).

Alternatively, the above contents may be specified in specifications. That is, the contents may be preconfigured for the BS and UE. Thus, the UE may receive/confirm the contents and perform an appropriate operation during the RACH procedure.

It is obvious that each of the examples of the proposed methods may also be included as one implementation method, and thus each example may be regarded as a kind of proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE or from a transmitting UE to a receiving UE through a predefined signal (e.g., a physical layer signal, a higher layer signal, etc.).

Methods, embodiments, or descriptions for implementing the method proposed in the present disclosure may be applied separately, or one or more methods (embodiments or descriptions) may be applied in combination.

Implementation Examples

Embodiments may be implemented by organically combining at least one of the above-described operations.

Figure 15:
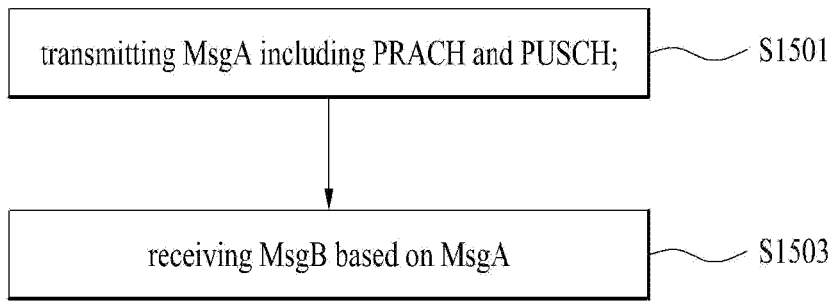

FIG. 15 illustrates one of the embodiments that may be implemented by a combination of the above-described operations.

A UE may transmit MsgA including a PRACH and a PUSCH to a BS (S1501) and receive MsgB for MsgA from the BS (S1503). Although not shown, from the perspective of the BS, the BS may receive MsgA including the PRACH and PUSCH from the UE and transmit MsgB for MsgA to the UE.

MsgA transmitted between the BS and UE may have structures proposed in the embodiments of the present disclosure. For example, MsgA may have structures illustrated and described with reference to FIGS. 10 to 14 of the present disclosure (in Sections 3.1 to 3.2). The PRACH preamble transmission in FIGS. 10 to 14 may be briefly referred to as PRACH transmission. The PUSCH part transmission in FIGS. 10 to 14 may be briefly referred to as PUSCH transmission. For example, in MsgA, ROs for transmitting a PRACH (or PRACH preamble) may be located in the first slot (or RACH slot), and POs for transmitting a PUSCH (or PUSCH part) may be located in the second slot (or PUSCH slot), as described/shown in Option 4 of Section 3.2 and FIG. 14(c).

In addition, the PRACH (or ROs) of MsgA may be configured with length-139 sequences repeatedly mapped in the frequency domain (frequency domain sequence repetition mapping) or a single long sequence with contiguous mapping in the frequency domain as shown in FIG. 14(c). The length of the single long sequence with contiguous mapping may be determined based on the OCB requirements and SCS. For example, the length of the single long sequence with contiguous mapping may be 571 in the 30 kHz SCS and 1151 in the 15 kHz SCS. The PUSCH (or POs) may be interlaced at the PRB level in the frequency domain (PRB level interlaced mapping).

Also, as shown in FIG. 14(c), a time interval may exist between ROs included in the first slot, and a time interval may also exist between POs included in the second slot.

In addition, the PRACH included in MsgA may be transmitted on the last time-domain RO (e.g., RO #5 in FIG. 14(c)) in the first slot, and the PUSCH may be transmitted on the first time-domain RO (e.g., PO #0 in FIG. 14(c)) in the second slot.

Further, One of the ROs in the RACH slot (e.g., one of RO #0, #1, #2, #3, #4, and #5 in FIG. 14(c)) and a plurality of POs among the POs in the PUSCH slot (e.g., two or more POs among POs #0, #1, #2, #3, #4, and #5 of FIG. 14C) may be associated.

In addition to the above-described operation of FIG. 25, one or more of the operations described before with reference to FIGS. 1 to 14 may further be performed in combination.

Discontinuous Reception (DRX) Operation

The UE may perform a DRX operation, while performing the afore-described/proposed procedures and/or methods. A UE configured with DRX may reduce power consumption by discontinuously receiving a DL signal. DRX may be performed in an RRC IDLE state, an RRC_INACTIVE state, and an RRC_CONNECTED stated. DRX is used for discontinuous reception of a paging signal in the RRC IDLE state and the RRC_INACTIVE state. Now, DRX performed in the RRC_CONNECTED state (RRC_CONNECTED DRX) will be described below.

Figure 16:
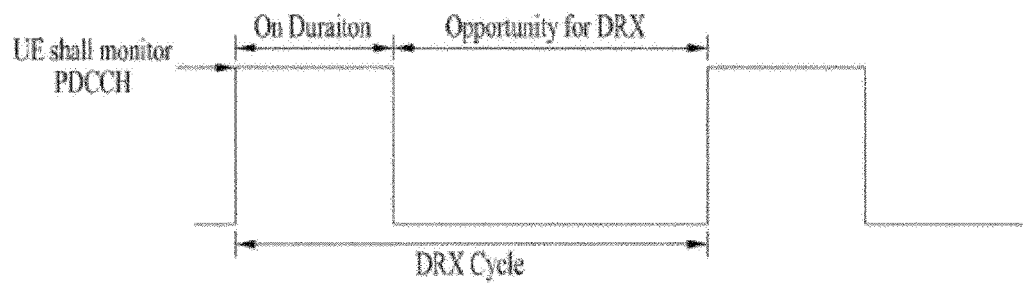

FIG. 16 is a diagram illustrating a DRX cycle (RRC_CONNECTED state).

Referring to FIG. 16, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 6 describes a UE operation related to DRX (in the RRC_CONNECTED state). Referring to Table 11, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 16.

TABLE 6

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

Before the operations described above with reference to FIG. 15 (for example, before step S1501), the UE may perform DRX-related operations. The UE performs PDCCH monitoring during the ON duration. If the UE successfully detects any PDCCH during the PDCCH monitoring, the UE may perform at least one random access procedure according to embodiments of the present disclosure.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 17:
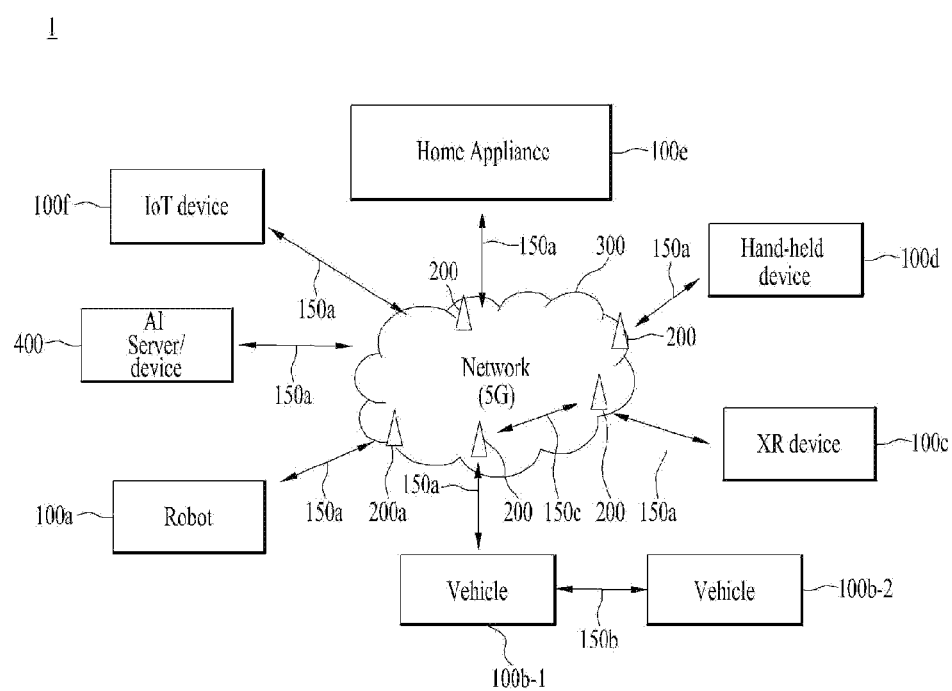
FIGS. 17 to 20 illustrate devices according to an embodiment of the present disclosure.

FIG. 17 illustrates a communication system 1 applied to the present disclosure.

Referring to FIG. 17, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 18:
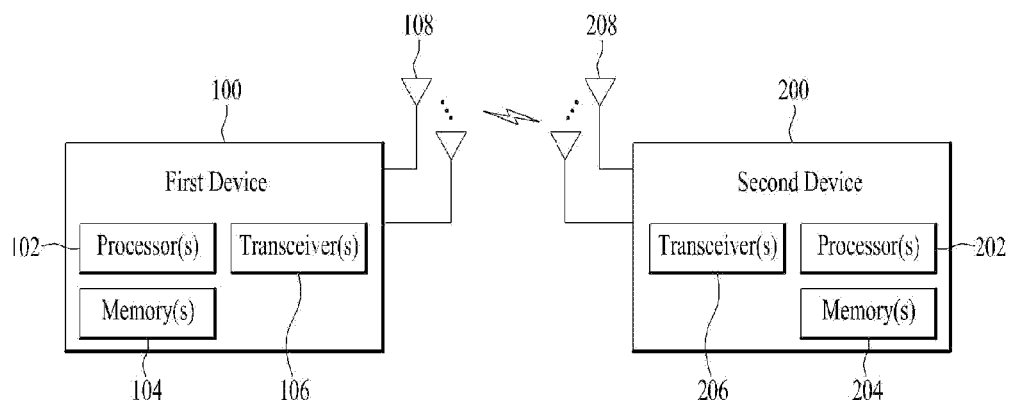

FIG. 18 illustrates wireless devices applicable to the present disclosure.

Referring to FIG. 18, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 19:
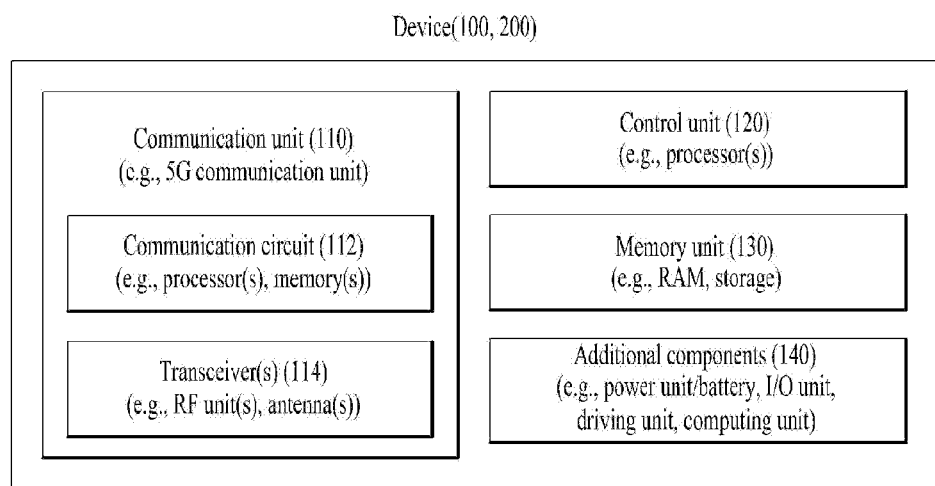

FIG. 19 illustrates another example of a wireless device applied to the present disclosure. The wireless device may be implemented in various forms according to a use case/service (refer to FIG. 17).

Referring to FIG. 19, wireless devices 100 and 200 may correspond to the wireless devices 100 and 200 of FIG. 18 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcasting terminal, a hologram device, a public safety device, an MTC device, a medical device, a FinTech device (or a finance device), a security device, a climate/environment device, the AI server/device (400 of FIG. 17), the BSs (200 of FIG. 17), a network node, or the like. The wireless device may be mobile or fixed according to a use case/service.

In FIG. 19, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 20:
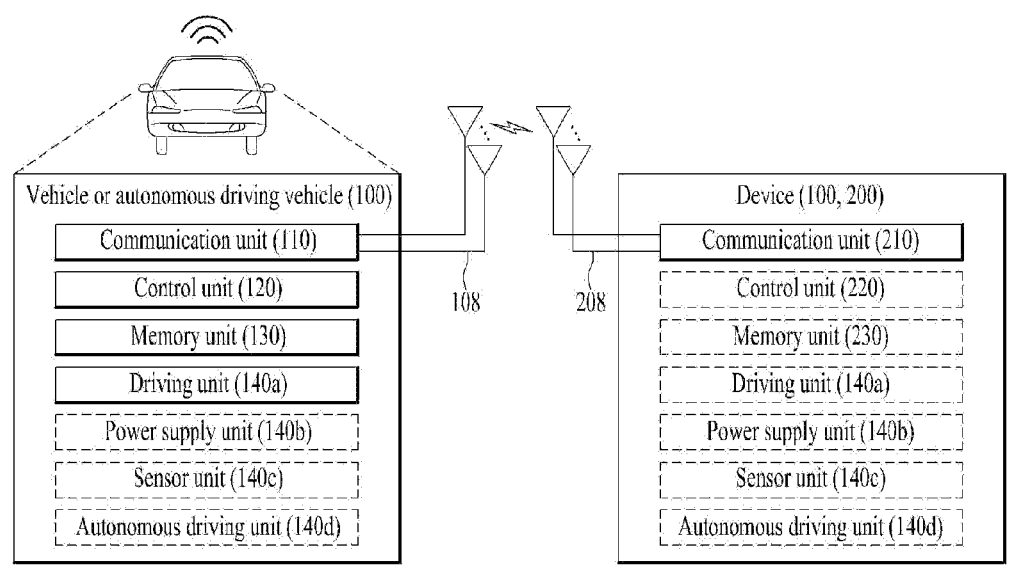

Example of Vehicle or Autonomous Driving Vehicle to which the Present Disclosure is Applied FIG. 20 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

The invention claimed is:

1. A method of transmitting and receiving a signal by a user equipment (UE) in a wireless communication system, the method comprising:

transmitting a message A including (i) a physical random access channel (PRACH) and (ii) a physical uplink shared channel (PUSCH); and receiving a message B based on the message A, wherein random access channel occasions (ROs) for transmission of the PRACH are located in a first time unit, and a time gap exists between every two ROs among the ROs, and one RO among the ROs is separated into a first band including a lowest RB of a specific frequency band and a second band including a highest RB of the specific frequency band, wherein PUSCH occasions (POs) for transmission of the PUSCH are located in a second time unit, a time gap exists between every two POs among the POs, one PO among the POs is comprised of a single band including a center RB of the specific frequency band, and the single band is not overlapped with the first band and the second band, and wherein the first time unit and the second time unit are time division multiplexed (TDMed) with each other.

2. The method of claim 1, wherein the PRACH is configured with length-139 sequences repeatedly mapped in a frequency domain or a single long sequence contiguously mapped in the frequency domain.

3. The method of claim 1, wherein the PRACH is transmitted on the one RO located last in a time domain within the first time unit, and wherein the PUSCH is transmitted on the one PO located first in the time domain within the second time unit.

4. The method of claim 1, wherein the one RO among the ROs is related to a plurality of POs among the POs.

5. A user equipment (UE) configured to transmit and receive a signal in a wireless communication system, the UE comprising:

at least one transceiver;

at least one processor; and at least one memory operably connected to the at least one processor and configured to store instructions that, when executed, cause the at least one processor to perform operations comprising:

transmitting a message A including (i) a physical random access channel (PRACH) and (ii) a physical uplink shared channel (PUSCH); and receiving a message B based on the message A, wherein random access channel occasions (ROs) for transmission of the PRACH are located in a first time unit, and a time gap exists between every two ROs among the ROs, and one RO among the ROs is separated into a first band including a lowest RB of a specific frequency band and a second band including a highest RB of the specific frequency band, wherein PUSCH occasions (POs) for transmission of the PUSCH are located in a second time unit, a time gap exists between every two POs among the POs, one PO among the POs is comprised of a single band including a center RB of the specific frequency band, and the single band is not overlapped with the first band and the second band, and wherein the first time unit and the second time unit are time division multiplexed (TDMed) with each other.

6. The UE of claim 5, wherein the PRACH is configured with length-139 sequences repeatedly mapped in a frequency domain or a single long sequence contiguously mapped in the frequency domain.

7. The UE of claim 5, wherein the PRACH is transmitted on the one RO located last in a time domain within the first time unit, and wherein the PUSCH is transmitted on the one PO located first in the time domain within the second time unit.

8. The UE of claim 5, wherein the one RO among the ROs is related to a plurality of POs among the POs.

9. An apparatus for a user equipment (UE), the apparatus comprising:

at least one processor; and at least one computer memory operably connected to the at least one processor and configured to store instructions that, when executed, cause the at least one processor to perform operations comprising:

transmitting a message A including (i) a physical random access channel (PRACH) and (ii) a physical uplink shared channel (PUSCH); and receiving a message B based on the message A, wherein random access channel occasions (ROs) for transmission of the PRACH are located in a first time unit, and a time gap exists between every two ROs among the ROs, and one RO among the ROs is separated into a first band including a lowest RB of a specific frequency band and a second band including a highest RB of the specific frequency band, wherein PUSCH occasions (POs) for transmission of the PUSCH are located in a second time unit, a time gap exists between every two POs among the POs, one PO among the POs is comprised of a single band including a center RB of the specific frequency band, and the single band is not overlapped with the first band and the second band, and wherein the first time unit and the second time unit are time division multiplexed (TDMed) with each other.

10. The apparatus of claim 9, wherein the PRACH is configured with length-139 sequences repeatedly mapped in a frequency domain or a single long sequence contiguously mapped in the frequency domain.

11. The apparatus of claim 9, wherein the PRACH is transmitted on the one RO located last in a time domain within the first time unit, and wherein the PUSCH is transmitted on the one PO located first in the time domain within the second time unit.

12. The apparatus of claim 9, wherein the one RO among the ROs is related to a plurality of POs among the POs.

* * * * *